Jan. 17, 1933. G. E. McCLOSKEY 1,894,471
METHOD AND APPARATUS FOR DISTILLING TAR AND SIMULTANEOUSLY
PRODUCING HIGH AND LOW MELTING POINT PITCHES
Filed Dec. 11, 1929 3 Sheets-Sheet 1

INVENTOR
Gregory Coleman McCloskey
BY
Pennie Davis Marvin & Edmonds
ATTORNEYS

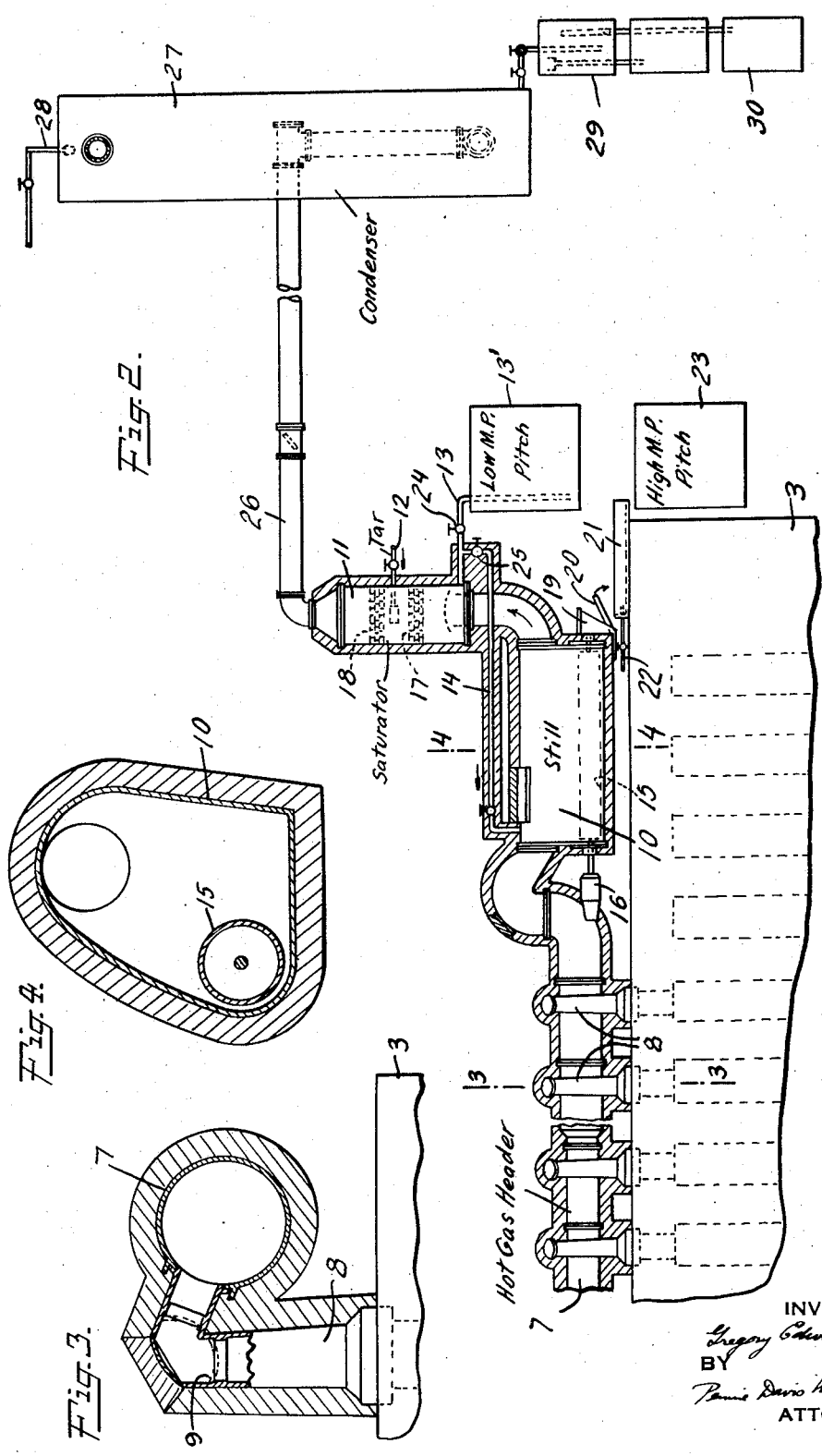

Jan. 17, 1933. G. E. McCLOSKEY 1,894,471
METHOD AND APPARATUS FOR DISTILLING TAR AND SIMULTANEOUSLY
PRODUCING HIGH AND LOW MELTING POINT PITCHES
Filed Dec. 11, 1929 3 Sheets-Sheet 3
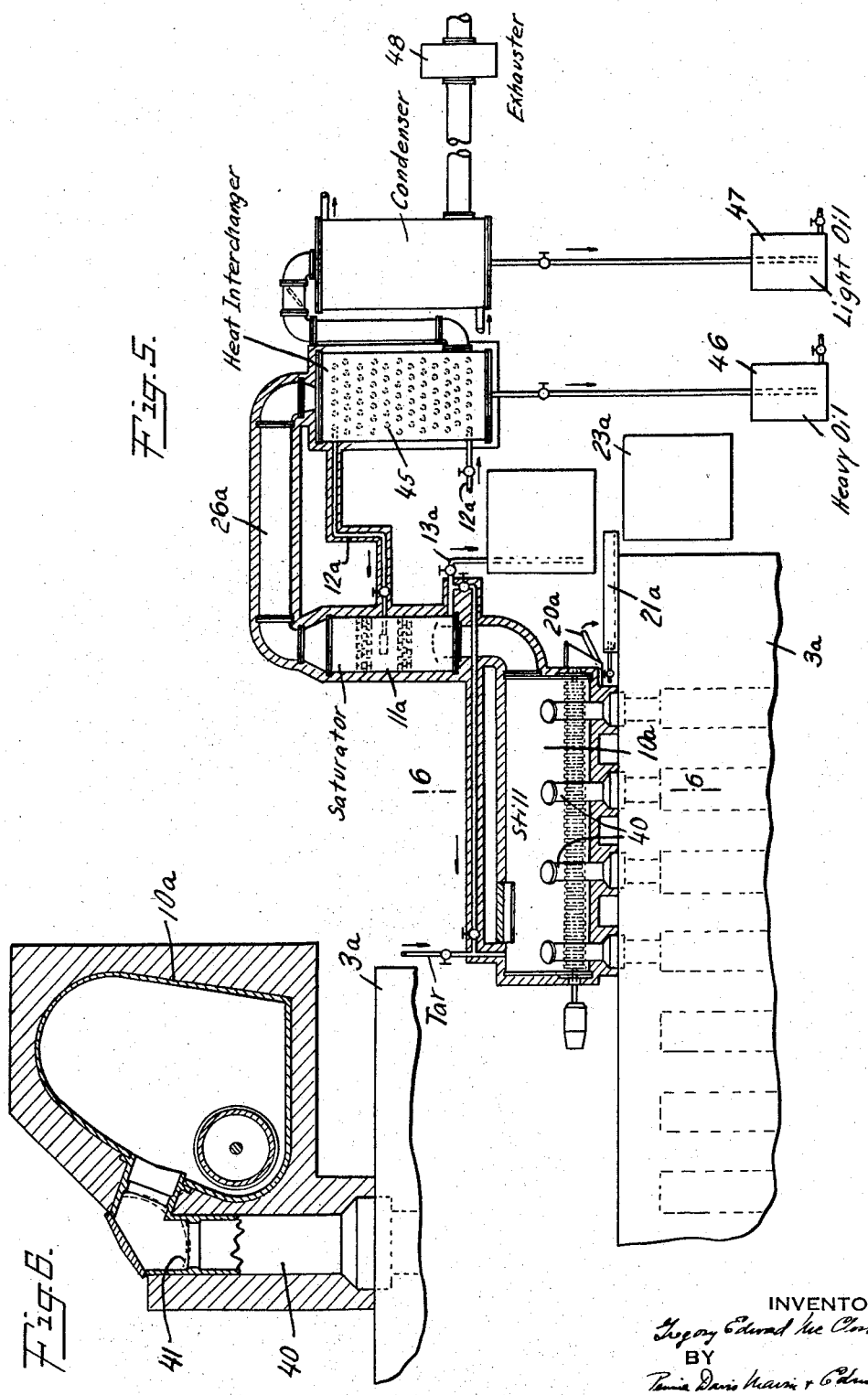

Patented Jan. 17, 1933

1,894,471

UNITED STATES PATENT OFFICE

GREGORY EDWARD McCLOSKEY, OF SOUTH ORANGE, NEW JERSEY, ASSIGNOR TO THE BARRETT COMPANY, OF NEW YORK, N. Y., A CORPORATION OF NEW JERSEY

METHOD AND APPARATUS FOR DISTILLING TAR AND SIMULTANEOUSLY PRODUCING HIGH AND LOW MELTING POINT PITCHES

Application filed December 11, 1929. Serial No. 413,259.

This invention relates to improvements in the distillation of tar and includes improvements in the process and apparatus therefor. More particularly, the invention relates to a method of distilling tar in two stages by direct contact with highly heated gases, such as coke oven gases, in which low melting point pitch and high melting point pitch are simultaneously produced and in which the high melting point pitch is produced by bringing a portion of the low melting point pitch produced in the first stage of the distilling process into direct contact with the highly heated gases in the second stage of the distilling process. The low melting point pitch is produced in the first stage of the distilling process by bringing tar into direct contact with the hot gases and vapors from the second stage of the distillation. A portion of the low melting point pitch is drawn off as a separate product and the balance is further distilled in the second stage of the distilling process to produce a pitch of high melting point.

According to this invention, all of the tar to be distilled is brought into direct contact with the hot gases and vapors in the first stage of the distilling process. This tar may advantageously be preheated by indirect contact with the gases and vapors coming from this stage of the distilling process, in a heat interchanger in which clean oils are condensed and separated from the gases simultaneously with the preheating operation. The preheated tar is then brought into direct contact with the gases and vapors from the second stage of the distilling operation, where pitch of a low melting point is produced. A portion of this pitch is drawn off as a separate product and the balance is then further distilled in the second stage of the distilling operation and pitch of high melting point is produced.

The apparatus of the present invention includes a still connected with a source of highly heated gases such as coke oven gases, with means for supplying low melting point pitch from the first stage of the distilling operation thereto, and with means for bringing this pitch in the form of a fine intense spray into intimate contact with the gases passing through the still to distill the low melting point pitch and produce high melting point pitch and hot enriched gases. The apparatus includes further distilling means herein referred to as a saturator which is advantageously in the form of a tower still in which the hot enriched gases from the still are brought into direct contact with the tar. At the bottom of the saturator is a draw-off for a portion of the low melting point pitch formed therein, and means is provided for supplying the balance of the low melting point pitch to the still. The apparatus may advantageously include a heat interchanger in which the tar fed to the saturator is brought into indirect contact with the hot gases and vapors leaving the tower. In this way, the tar may be preheated simultaneously with condensation and separation of oils from the enriched gases. Additional condensing means may be provided as desired.

The gases fed to the still for carrying out the distillation to produce high melting point pitch are highly heated waste gases which are available in large amounts and at high temperatures at various coal carbonization or coal distillation plants, such as coke oven plants, gas retort plants, producer gas plants, water gas plants, etc. The gases from coke ovens for example, leave the coke ovens at a temperature about 450 to 850° C. or higher. These highly heated gases are at such a high temperature that they cannot be brought into contact with a limited amount of tar or pitch in an indiscriminate manner without coking of the tar or pitch, since the gases are at a temperature considerably higher than that at which coking of tar will occur. However, by bringing the low melting point pitch from the first stage of the distilling operation into thorough and intense contact with such highly heated gases in the form of an intense and well distributed spray, the gases are rapidly, indeed almost instantly, cooled to a much lower temperature approaching that to which the pitch is heated and the low melting point pitch can be rapidly distilled in this way to produce pitch of high melting point, for example, pitch of melting point up to 400° F. or higher. When pitch of such high melting point is produced, the gases and admixed vapors leave the still at a high temperature, for example, a temperature about 250 to 400° C.

These hot enriched gases may be saturated with respect to the heaviest constituents distilled from the pitch, but they are unsaturated with respect to lower boiling constituents. These hot enriched gases have a considerable distillation capacity for tar or preheated tar, and by bringing a regulated amount of such tar or preheated tar into direct and intimate contact with the hot enriched gases, a considerable distillation of oils from the tar can be effected with resulting increase in the content of the enriched gases in lower boiling oil vapors. Some of the heaviest constituents carried in the hot enriched gases may be condensed such as heavy resinous or semi-solid constituents, depending upon the temperature to which the hot enriched gases are cooled by direct contact with the tar or pitch to be distilled. Such heavy constituents as are separated out from the hot enriched gases will be drawn off with the low melting point pitch and the distillate oil subsequently condensed from the hot enriched gases will be lower in such heavier constituents. The hot enriched gases will leave the first stage of the distilling operation at a lower temperature and with an increased percentage of oil vapors, particularly of lighter oil vapors and with varying amounts of the heavier vapor constituents separated therefrom and removed with the low melting point pitch.

The hot enriched gases resulting from this first stage of the distilling operation can be led directly to total condensers to separate from them all condensable vapors, or they can be employed for the preheating of tar in an indirect condenser which serves to simultaneously preheat the tar and partially condense the condensable vapors from the enriched gases. By counter-current flow of the tar and the hot enriched gases, the tar can be preheated to a temperature approaching that of the hot entering gases, and the gases can be cooled to a temperature approaching that of the cold entering tar. This preheating of the tar is particularly advantageous, since it enables the tar to be supplied to the first stage of the distilling operation at a temperature sufficiently high to greatly promote the distillation and thereby increase the capacity of the apparatus.

The tar distilled in the present process may be coke oven tar, gas retort tar, low temperature carbonization tar, water gas tar, producer gas tar, etc. or heavy or lighter tars or tarry oils or pitches, etc. The invention is particularly valuable for the distillation of coal tar at by-product coke oven plants, where a large volume of high temperature gases are available containing waste heat which is commonly dissipated and lost. By the practice of the present invention at a by-product coke oven plant, it is possible to produce, for example, high melting point pitch of about 400° F. melting point or higher, and a high percentage of oil vapor and simultaneously to produce a pitch of lower melting point by utilization of the hot enriched gases resulting from the production of the high melting point pitch. Various oil fractions can be simultaneously produced, e. g. a creosote oil, a tar acid or carbolic oil, etc.

By regulating the proportion of low melting point pitch drawn off from the saturator as a separate product at the end of the first stage of the distilling operation, the amount of high melting point pitch produced is controlled. The low melting point pitch may be used for road treating purposes or for fuel, etc. or it may be blended with the high melting point pitch to produce desired blended pitch compositions. Blending of pitches in this manner to produce pitches of intermediate melting point is desirable when distillate including oils of higher boiling range is desired.

The invention will be further described in connection with the accompanying drawings, which are of a more or less diagrammatic character and which illustrate different forms of apparatus embodying the invention and adapted for the practice of the process of the invention, but it is intended and will be understood that the invention is illustrated thereby but is not limited thereto.

The drawings show the invention applied more particularly to coke oven plants, with utilization of the hot coke oven gases drawn off at a high temperature from the individual coke ovens and employed under conditions where practically their maximum distillation capacity can be utilized.

In the drawings;

Fig. 2 is an elevation partly in section of the apparatus of Fig. 1;

Fig. 3 is a section on the line 3—3 of Fig. 2;

Fig. 4 is a section on the line 4—4 of Fig. 3;

Fig. 5 is an elevation partly in section of modified apparatus; and

Fig. 6 is a section of the line 6—6 of Fig. 5.

Figure 1:
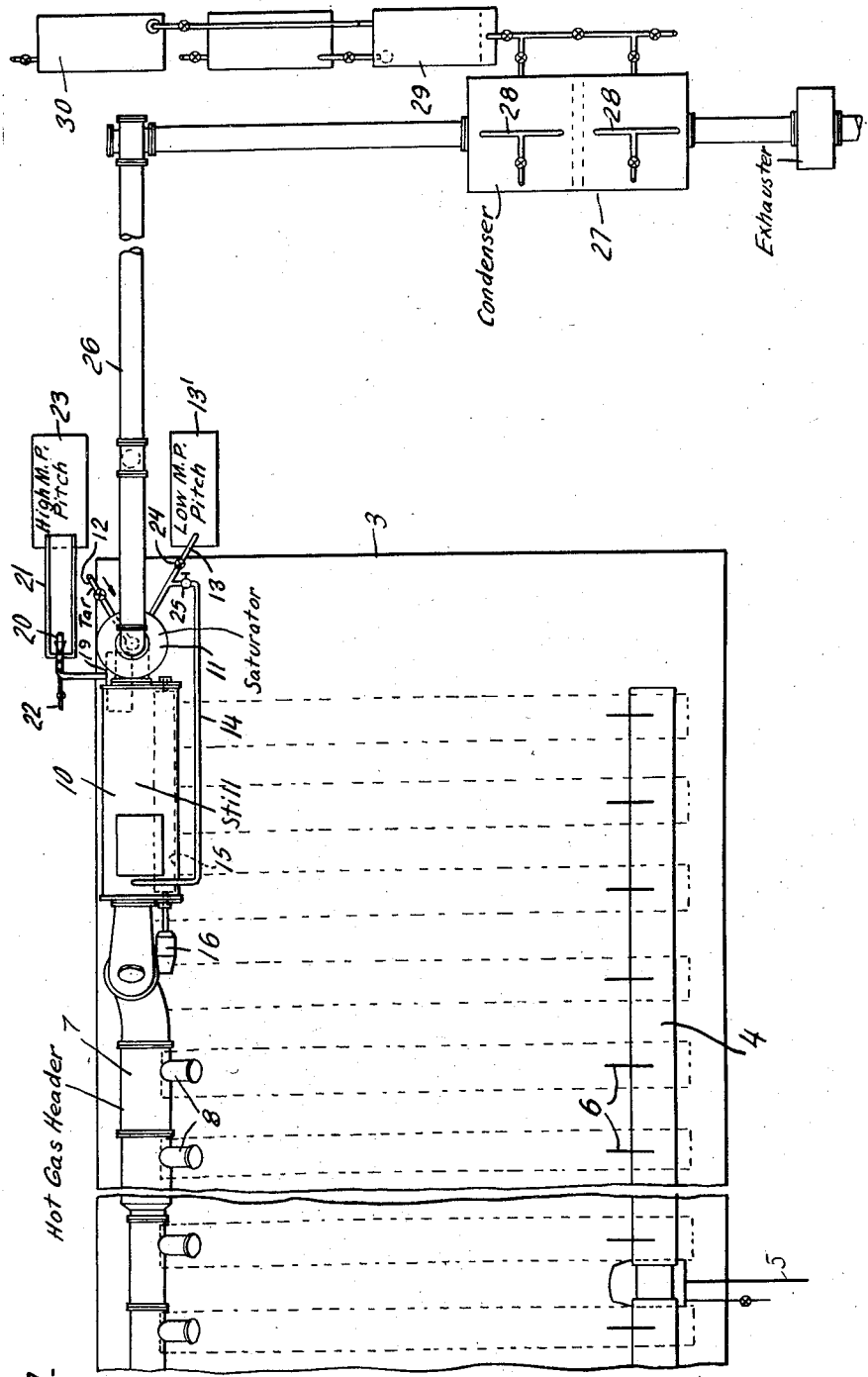
Fig. 1 is a plan view of a coke oven plant equipped for carrying out the invention.

Figs. 1 and 2 show a coke oven battery 3 equipped with a collector main 4 and crossover main 5, which may be of the usual type. The collector main is connected to the individual ovens of the battery through the uptake pipes 6. As this apparatus may be of the usual type, it is shown schematically in the drawings.

At the opposite side of the coke oven block, a hot gas header 7 is shown, which is connected with several of the ovens of the battery through uptake pipes 8. Valves 9 are provided in these uptake pipes and by proper manipulation of these valves and valves in the uptake pipes 6 which connect these same ovens to the collector main 4 the gases from these ovens may be passed to the collector main 4 or through the hot gas header 7 into the still 10, where they are employed for the distillation of tar.

The resulting hot gases and vapors pass into the saturator 11 where tar supplied through the pipe 12 is distilled to pitch of low melting point. A portion of this pitch is drawn off through the pipe 13 and the balance is conveyed through the line 14 to that end of the still 10 at which the hot gases enter. This low melting point pitch is sprayed into the gases in the still 10 in the form of a fine intense spray by the roller 15 which is rotated at a high speed, for example, 900 to 1200 R. P. M. by the motor 16. This fine intense spray exposes a large surface of the pitch to the action of the hot gases and pitch of high melting point is produced. The temperature of the gases is rapidly reduced and simultaneously impurities entrained in the gases are scrubbed from the gases so that the gases leaving the still 10 and entering the saturator 11 are substantially freed from entrained impurities. Baffles 17 and 18 are provided in the saturator below and above the tar inlet to provide for the removal of any particles of spray that may be carried by the gases.

The low melting point pitch supplied to the still 10 by the line 14 is distilled to pitch of high melting point in this still. This high melting point pitch is drawn off through the tar trap 19 and the levelling arm 20 into the trough 21 where it is cooled by a jet of cold water from the pipe 22. This granulates the pitch and it is collected in the bin 23.

The tar supplied through the line 12 is partially distilled in the tower still or saturator 11 and low melting point pitch is formed. This pitch may comprise constituents condensed and removed from the gases passing from the still 10 up through the tower, as well as residue resulting from the partial distillation of the tar supplied through the line 12. A portion of this low melting point pitch is drawn off as a separate product through the line 13 into the storage tank 13′. The remainder is supplied to the still 10 through the line 14. Valves 24 and 25 are provided to regulate the proportion of low melting point pitch drawn off as a separate product and the proportion fed to the still 10.

The enriched gases resulting from the two-stage distilling operation are drawn off from the top of the saturator 11 through the line 26 and pass to suitable condensing means indicated at 27. Direct condensers or indirect condensers may be employed. A direct condenser is shown in which water or ammonia liquor is sprayed into the gases from the line 28. The condensate is drawn off into the decanter 29 from which clean oils are separately collected in the tank 30. By regulating the condensing operation, two or more clean oil fractions may be produced where desired.

Figs. 5 and 6 show apparatus for a two-stage distilling operation with means for preheating the tar supplied to the first stage of the distilling operation. Instead of collecting the gases from selected ovens of the battery by a hot gas header and passing them through the header to the still, Figs. 5 and 6 show an arrangement in which hot gases from selected ovens of the battery 3a pass through individual uptake pipes 40 directly into the still 10a. Valves 41 are shown in these uptake pipes.

High melting point pitch is produced in the still 10a and low melting point pitch is produced in the tower or saturator 11a. The high melting point pitch is drawn off through the levelling arm 20a, granulated in a stream of cold water in the trough 21a, and run into the bin 23a, and the low melting point pitch is collected through the line 13a. The operation is similar to that described in connection with Figs. 1 and 2.

The hot enriched gases passing from the saturator 11a through the line 26a are brought into indirect contact with the incoming tar fed to the saturator through the tar line 12a in the heat interchanger 45. Oils condensed from the gases in the heat interchanger simultaneously with the preheating of the tar are collected in the tank 46. Additional condensing means is shown for separating lighter oils from the gases. The lighter oils are collected in the storage tank 47. An exhauster 48 is shown for drawing the gases and vapors through the system.

The stills 10 and 10a and the saturators 11 and 11a and the pipes through which the hot gases pass are advantageously heavily insulated to prevent loss of heat by radiation.

I claim:

1. The two-stage method of distilling tar in which low melting point pitch is produced in the first stage of the process and high melting point pitch is produced in the second stage, which comprises bringing low melting point pitch from the first stage of the distilling operation into direct contact with highly heated waste-heat gases whereby the low melting point pitch is distilled and pitch of high melting point is produced, bringing tar into direct contact with the hot gases and vapors resulting from this second stage of the distilling operation to distill the tar and produce the low melting point pitch and drawing off a portion of the low melting point pitch as a separate product.

2. The process of distilling tar which comprises bringing low melting point pitch into direct and intimate contact with highly heated gases at a sufficient temperature and with regulation of the process to produce a high melting point pitch residue and hot gases enriched in oil vapors, passing the hot enriched gases into direct contact with tar to effect distillation thereof and to produce the pitch of low melting point, and drawing off part of the resulting pitch as a low melting point pitch product.

3. The method of distilling tar which comprises bringing low melting point pitch into direct and intimate contact with highly heated gases under regulated conditions to produce high melting point pitch and hot enriched gases, bringing the hot enriched gases into direct contact with preheated tar to effect distillation thereof and the production of the low melting point pitch, withdrawing part of said pitch as a low melting point pitch product, and passing admixed gases and vapors resulting from the production of the high and low melting point pitches into indirect heat interchanging relation with tar so as to condense and separate oils from the gases and to preheat the tar thus producing the preheated tar.

4. The method of distilling coal tar to produce high melting point pitch and low melting point pitch which comprises bringing low melting point pitch resulting from the distillation of the tar into direct and intimate contact with hot coke oven gases so as to produce a high melting point pitch of at least 400° F. melting point, drawing off hot enriched gases resulting from such distillation and bringing them into direct and intimate contact with tar to effect distillation thereof and the production of the low melting point pitch, and withdrawing a portion of the low melting point pitch as a separate product.

5. The method of distilling coal tar at coke oven plants which comprises supplying hot coke oven gases to a still, subjecting the gases to an intense and thorough spraying with low melting point pitch in the still and regulating the operation so as to distill the low melting point pitch and produce a high melting point pitch therefrom, passing the resulting hot enriched gases into direct and intimate contact with preheated tar to effect distillation thereof and the production of the low melting point pitch, drawing off part of the low melting point pitch as a separate product, and passing the gases and vapors resulting from the two-stage distilling operation into indirect contact with tar to preheat the tar and thus produce the preheated tar.

6. Apparatus for distilling tar, comprising a first still having means for introducing highly heated gases thereto and for removing hot enriched gases therefrom and having means for introducing low melting point pitch thereto and for spraying the pitch into the hot gases in the still to effect rapid distillation thereof and the production of high melting point pitch and hot enriched gases, a second still with means for introducing tar thereto and for withdrawing low melting point pitch therefrom and arranged for the introduction thereto of the hot enriched gases and for the removal of the resulting enriched gases therefrom, means for separately withdrawing a portion of the low melting point pitch from the second still, and means for supplying another portion of the low melting point pitch to the first still.

7. An improvement in the apparatus of the next preceding claim, in which an indirect heat interchanger is provided for preheating the tar by indirect contact with the hot gases and vapors coming from the saturator and for simultaneously cooling the gases and vapors and condensing oils therefrom.

8. In combination with a coke oven plant, a first still with means for passing hot coke oven gases from the ovens of the plant therethrough, a second still with means for passing hot gases and vapors from the first still therethrough, means for supplying tar to the second still so as to distill the tar and produce low melting point pitch, means for separately collecting a portion of the low melting point pitch, means for supplying another portion of the low melting point pitch to the first still and means in the first still for spraying the low melting point pitch into the hot gases in the form of a fine intense spray.

9. The method of distilling tar which comprises bringing low melting point pitch into direct and intimate contact with highly heated gases at a sufficient temperature and with regulation of the process to distill from the low melting point pitch constituents comprising heavy resinous or semi-solid constituents and produce a high melting point pitch residue and hot gases enriched in vapors of constitutents distilled from the low melting point pitch, passing the hot enriched gases into direct contact with tar to effect distillation thereof and cool the enriched gases so that at least part of the heavy resinous or semi-solid constituents will be condensed while lower boiling constituents are carried forward by the gases in vapor form thereby producing from the tar the pitch of low melting point, and drawing off part of the resulting pitch as a low melting point pitch product.

10. The two-stage method of distilling tar in which low melting point pitch is produced in the first stage of the process and high melting point pitch is produced in the second stage, which comprises bringing low melting point pitch from the first stage of the distilling operation into direct contact with highly heated waste-heat gases whereby the low melting point pitch is distilled and pitch of high melting point is produced, bringing tar into direct contact with the hot gases and vapors resulting from this second stage of the distilling operation to distill the tar and produce the low melting point pitch, drawing off a portion of the low melting point pitch as a separate product, and cooling the gases and vapors resulting from the two-stage distilling operation to separate distillate oils comprising constitutents vaporized in each stage of the distillation.

In witness whereof I affix my signature.
GREGORY EDWARD McCLOSKEY.